(12) United States Patent  (10) Patent No.: US 7,646,682 B2
Lei et al.  (45) Date of Patent: Jan. 12, 2010

(54) FOCUSING CONTROLLER AND METHOD THEREOF FOR AN OPTICAL DISK DRIVE

(76) Inventors: Keng-Lon Lei, 8F, No. 533, Chung-Cheng Rd., Hsin-Tien, Taipei (TW); Chine-Hung Chen, 8F, No. 533, Chung-Cheng Rd., Hsin-Tien, Taipei (TW)

( * ) Notice: Subject to any disclaimer, the term of this patent is extended or adjusted under 35 U.S.C. 154(b) by 530 days.

(21) Appl. No.: 10/990,860

(22) Filed: Nov. 17, 2004

(65) Prior Publication Data

US 2005/0105416 A1 May 19, 2005

Related U.S. Application Data

(60) Provisional application No. 60/520,711, filed on Nov. 17, 2003.

(51) Int. Cl.
*G11B 7/00* (2006.01)

(52) U.S. Cl. .................................... 369/44.29

(58) Field of Classification Search ........ None
See application file for complete search history.

(56) References Cited

U.S. PATENT DOCUMENTS

| 4,390,781 | A | * | 6/1983 | Musha | 250/204 |
| 4,512,004 | A | | 4/1985 | Nonaka | 369/45 |
| 4,707,648 | A | * | 11/1987 | Minami | 318/640 |
| 4,707,816 | A | | 11/1987 | Yonezawa et al. | |
| 4,878,211 | A | | 10/1989 | Suzuki et al. | |
| 5,029,155 | A | | 7/1991 | Kenjo | |
| 5,146,443 | A | | 9/1992 | Iwase et al. | |
| 5,199,015 | A | | 3/1993 | Edahiro et al. | |
| 5,216,659 | A | | 6/1993 | Call et al. | |
| 5,245,598 | A | | 9/1993 | Burroughs | 369/44.28 |
| 5,297,114 | A | * | 3/1994 | Itoh et al. | 369/44.32 |
| 5,367,513 | A | | 11/1994 | Bates et al. | |

(Continued)

FOREIGN PATENT DOCUMENTS

CN 1407552 4/2003

(Continued)

OTHER PUBLICATIONS

Machine translation of Takahashi, JP 05-135381 A, published Jun. 1, 1993.*

(Continued)

*Primary Examiner*—Peter Vincent Agustin
(74) *Attorney, Agent, or Firm*—Perkins Coie LLP

(57) ABSTRACT

A focusing controller and a method thereof for an optical disk drive. The focusing controller includes a filter which filters out a high-frequency component of the track error signal to output an adjusted signal, a coupler which couples the focus error signal with the adjustment signal to generate a coupled signal. The focusing controller further includes a focus compensator which receives the coupled signal and output the focus control signal to control position of the pick up head of the optical disk drive out of focus such that the coupling of the track error signal with the focus error signal is improved and also the stability of the servo system. While seeking ended, the offset signal is removed to resume the position of the optical pick-up head to the normally focus position.

16 Claims, 2 Drawing Sheets

U.S. PATENT DOCUMENTS

| | | | | |
|---|---|---|---|---|
| 5,475,664 | A | * | 12/1995 | Shimizume et al. ...... 369/44.29 |
| 5,504,726 | A | * | 4/1996 | Semba ............... 369/44.28 |
| 5,563,920 | A | | 10/1996 | Fimoff et al. |
| 5,568,464 | A | | 10/1996 | Horie |
| 5,587,985 | A | | 12/1996 | Sano et al. |
| 5,602,814 | A | | 2/1997 | Jaquette et al. |
| 5,623,465 | A | | 4/1997 | Sasaki et al. |
| 5,642,340 | A | * | 6/1997 | Nomura ............... 369/44.25 |
| 5,677,935 | A | | 10/1997 | Karino |
| 5,703,848 | A | * | 12/1997 | Hofer ................. 369/44.29 |
| 5,710,748 | A | | 1/1998 | Hofer |
| 5,732,052 | A | | 3/1998 | Ando et al. |
| 5,748,584 | A | * | 5/1998 | Maezawa ............... 369/44.29 |
| 5,844,920 | A | | 12/1998 | Zook et al. |
| 6,069,667 | A | | 5/2000 | Ueda et al. |
| 6,069,855 | A | | 5/2000 | Fuma et al. |
| 6,157,601 | A | | 12/2000 | Kao et al. |
| 6,269,058 | B1 | | 7/2001 | Yamanoi et al. |
| 6,404,713 | B1 | | 6/2002 | Ueki |
| 6,560,173 | B2 | | 5/2003 | Shimamura et al. |
| 6,611,123 | B2 | | 8/2003 | Ono |
| 6,628,594 | B1 | | 9/2003 | Park |
| 6,633,523 | B1 | * | 10/2003 | Masaki et al. ............ 369/44.32 |
| 6,691,203 | B1 | | 2/2004 | Chen et al. |
| 6,731,624 | B1 | | 5/2004 | Maekawa et al. |
| 6,745,167 | B2 | | 6/2004 | Sun |
| 6,757,239 | B2 | | 6/2004 | Minamino et al. |
| 6,882,611 | B2 | | 4/2005 | Chen |
| 6,906,986 | B2 | | 6/2005 | Lee et al. |
| 6,934,227 | B2 | | 8/2005 | Nakata et al. |
| 6,970,522 | B1 | | 11/2005 | Morling et al. |
| 7,035,176 | B2 | | 4/2006 | Tsai |
| 7,092,324 | B2 | | 8/2006 | Koh |
| 7,095,693 | B2 | | 8/2006 | Sasaki et al. |
| 7,120,100 | B2 | | 10/2006 | Hung et al. |
| 7,149,169 | B2 | | 12/2006 | Juan et al. |
| 7,242,650 | B2 | | 7/2007 | Tsai et al. |
| 7,245,573 | B2 | | 7/2007 | Eom |
| 7,286,462 | B2 | | 10/2007 | Tsai et al. |
| 7,298,674 | B2 | | 11/2007 | Lai et al. |
| 7,349,310 | B2 | | 3/2008 | Chen et al. |
| 7,385,896 | B2 | | 6/2008 | Lai et al. |
| 2002/0009026 | A1 | | 1/2002 | Shimamura et al. |
| 2002/0013350 | A1 | | 1/2002 | Nishiguchi et al. |
| 2002/0131350 | A1 | * | 9/2002 | Kurobe et al. ............ 369/47.4 |
| 2003/0048707 | A1 | | 3/2003 | Ono |
| 2003/0053387 | A1 | | 3/2003 | Lee et al. |
| 2003/0147315 | A1 | | 8/2003 | Iwazawa et al. |
| 2003/0169649 | A1 | * | 9/2003 | Takaoka et al. ......... 369/44.26 |
| 2004/0037177 | A1 | | 2/2004 | Buchler |
| 2004/0052183 | A1 | | 3/2004 | Yu et al. |
| 2004/0130993 | A1 | | 7/2004 | Nadershahi |
| 2004/0179451 | A1 | | 9/2004 | Morishima et al. |
| 2005/0105436 | A1 | | 5/2005 | Tsai |
| 2005/0157606 | A1 | | 7/2005 | Hu et al. |
| 2005/0195717 | A1 | | 9/2005 | Lai et al. |
| 2005/0251671 | A1 | | 11/2005 | Ouyang et al. |
| 2006/0013083 | A1 | | 1/2006 | Koh |
| 2006/0039252 | A1 | | 2/2006 | Chu |
| 2006/0056555 | A1 | | 3/2006 | Oono et al. |
| 2007/0237044 | A1 | | 10/2007 | Jin et al. |
| 2008/0205240 | A1 | | 8/2008 | Lai et al. |
| 2009/0003163 | A1 | | 1/2009 | Chen et al. |

FOREIGN PATENT DOCUMENTS

| | | |
|---|---|---|
| CN | 1619660 | 5/2005 |
| CN | 1619661 | 5/2005 |
| CN | 1619662 | 5/2005 |
| CN | 1619667 | 5/2005 |
| CN | 1619668 | 5/2005 |
| CN | 1629947 | 6/2005 |
| JP | 63117336 | 5/1988 |
| JP | 10040546 | 2/1998 |
| JP | 10083540 | 3/1998 |
| JP | 2001067682 | 3/2001 |
| TW | 200518049 | 6/2005 |
| TW | 200518073 | 6/2005 |
| TW | 200518078 | 6/2005 |
| TW | 200518081 | 6/2005 |
| TW | 200522040 | 7/2005 |
| TW | 200518048 | 12/2006 |
| WO | WO-02/49023 | 6/2002 |

OTHER PUBLICATIONS

Notice of Allowance; U.S. Appl. No. 10/990,665; Mailed Jan. 29, 2008 (8 pgs.).

Final Office Action; U.S. Appl. No. 10/990,665; Mailed Oct. 2, 2007 (10 pos.).

Notice of Allowance; U.S. Appl. No. 10/990,655; Mailed Jun. 11, 2009 (9 pgs.).

Notice of Allowance; U.S. Appl. No. 10/990,669; Mailed Sep. 20, 2007 (4 pgs.).

Ex Parte Quayle Office Action; U.S. Appl. No. 10/990,669; Mailed Jul. 13, 2007 (6 pgs.).

Notice of Allowance; U.S. Appl. No. 10/990,805; Mailed Oct. 26, 2007 (7 pgs.).

Ex Parte Quayle Office Action; U.S. Appl. No. 10/990,805; Mailed Jul. 24, 2007 (10 pgs.).

Notice of Allowance; U.S. Appl. No. 10/990,909; Mailed Aug. 15, 2007 (9 pgs.).

* cited by examiner

FOCUSING CONTROLLER AND METHOD THEREOF FOR AN OPTICAL DISK DRIVE

This application claims the benefit of U.S. provisional application Ser. No. 60/520,711, filed Nov. 17, 2003, the subject matter of which is incorporated herein by reference.

BACKGROUND OF THE INVENTION

1. Field of the Invention

The invention relates in general to a focusing controller and the method thereof, and more particularly to a focusing controller and the method thereof used in an optical disk drive.

2. Description of the Related Art

In conventional operation, optical disc drives are subject to the control of servo signals. Among the servo signals of an optical disk drive, the focus error signal Fe is used to control the position of its pick up head, so as to focus the laser beam emitted by the pick up head on the optical disk. FIG. 1 is a block diagram of a convention optical disk drive. Conventional optical disk drive 100 includes a focusing controller 120 and a pick up head 110 to access an optical disk 130. The pick up head 110 outputs a focus error signal Fe according to the reflected light from the optical disk 130. The focusing controller 120 outputs a focus control signal Foo to control the pick up head 110 according to the focus error signal Fe.

FIG. 2 is a diagram of the focusing controller, which mainly includes an analog-to-digital converter (A/D converter) 210, a focus compensator 220 and a digital-to-analog converter (D/A converter) 230. Functionally speaking, the A/D converter 210 is to receive and digitize the focus error signal Fe, for outputting a digital focus error signal to the focus compensator 220. Then, in subsequence, the D/A converter then converts the output of the focus compensator 220 to generate the focus control signal Foo for controlling the position of the pick up head 110.

However, noises inside the optical disk drive affect the servo signals, including the focus error signal, so that the laser beam cannot precisely focus on the optical disk. There includes a plurality of tracks having pits and lands thereon used to record information on the surface of an optical disk. However, the focus error signal Fe is easily coupled with the track error signal Te during tracking operations, which indicates that the pickup head may not be allocated at an accurate position during the following focusing operations since the currently derived focus error signal Fe is erroneous because of coupling low-frequency error component from the track error signal Te. FIG. 3 shows waveform diagrams of the track error signal Te and the focus error signal Fe during tracking operations. Obviously, the focus error signal Fe is usually coupled with the low-frequency component of the track error signal Te such that the actually focus status of the pickup head may not obtained due to an erroneous Fe is derived.

SUMMARY OF THE INVENTION

It is therefore an object of the invention to provide an apparatus and method of focusing control in an optical disk drive so as to focus the laser beam precisely on the surface of an optical disk.

The invention achieves the above-identified object by providing an optical disk drive which includes an optical pick-up head and a focusing controller. The optical pick-up head is for emitting a laser beam to access the optical disk and outputting a focus error signal according to the reflected light from the optical disk. The focusing controller includes a coupler and a focus compensator. The coupler couples the focus error signal with the offset signal to generate a coupled signal. The focus compensator receives the coupled signal and outputs the focus control signal to control the pick up head of the optical disk drive such that, while seeking, the position of the optical pick-up head is out of the focus point with the optical disk for reducing the coupling of the track error signal with the focus error signal and enhancing the stability of the servo system.

The invention achieves another above-identified object by providing a control method for stabilizing a servo system while an optical electronic device executing seeking. The optical electronic device includes an optical pick-up head and a focusing controller. The optical electronic device is used for outputting a focus control signal to control the optical pick-up head for accessing an optical disk. In an embodiment, the focus error signal is coupled with an offset signal to generate a coupled signal. Next, the coupled signal is input to the focusing controller for outputting the focus control signal. The offset signal is for coupling with the focus error signal such that the position of the optical pick-up head is out of the focus point with the optical disk. When the seeking has ended, the offset signal is eliminated which causes the position of the optical pick-up head and laser beam to be in the focus point with the optical disk.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
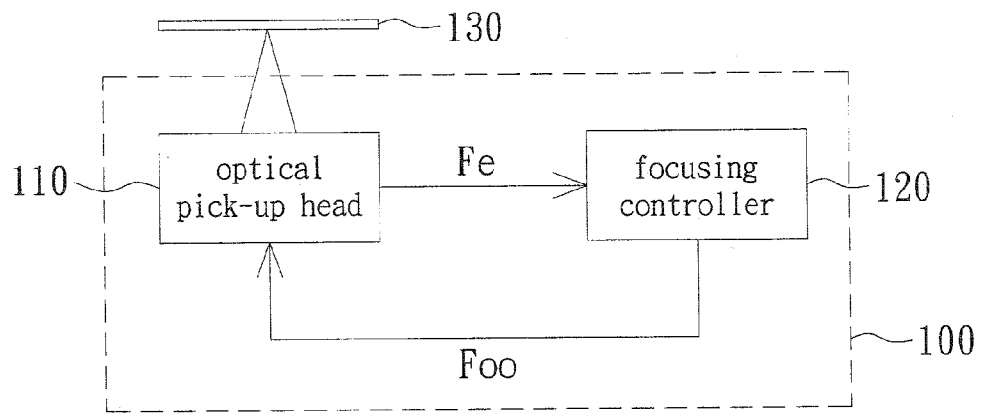
FIG. 1 (prior art) is a block diagram of a convention optical disk drive.
Figure 2:
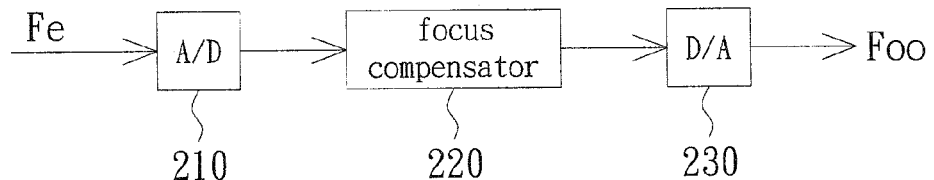
FIG. 2 (prior art) is a diagram of the focusing controller.
Figure 3:
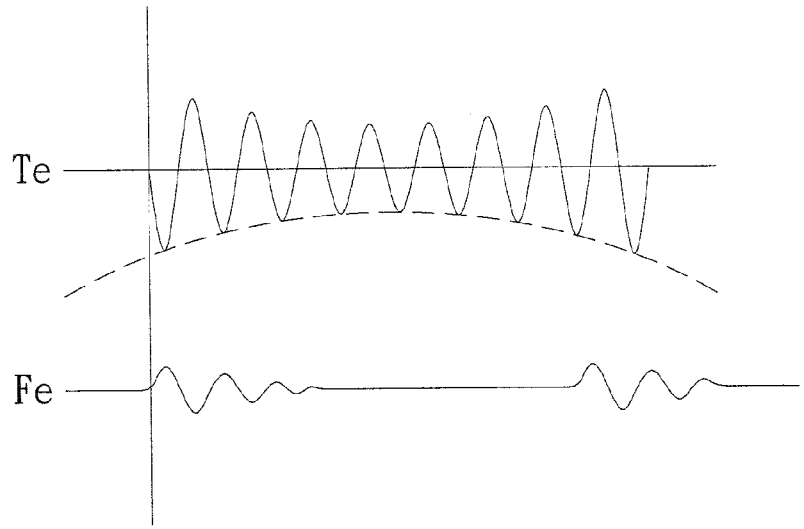
FIG. 3 is a waveform diagram showing the track error signal Te and the focus error signal during tracking.
Figure 4:
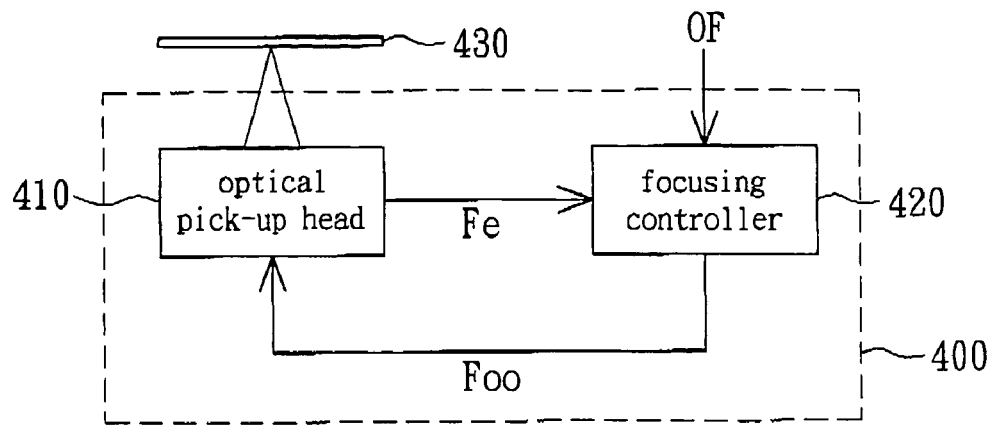
FIG. 4 is a diagram of an optical disk drive according to a preferred embodiment of the invention.

FIG. 4 is a diagram of an optical disk drive according to a preferred embodiment of the invention, which includes a focusing controller 420 and a pick up head 410 for emitting a laser beam onto an optical disk 430 so as to access data recorded on the optical disk 430. When the focus error signal Fe according to the reflected light from the optical disk 430, the focusing controller 420 outputs focus control signal Foo according to an offset signal OF and the focus error signal Fe so as to control the position of the pick up head 410.

Figure 5:
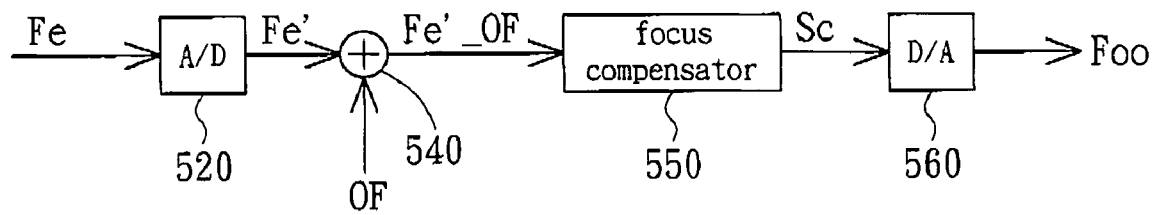
FIG. 5 is a diagram showing the focusing controller of the preferred embodiment.

FIG. 5 is a diagram showing the focusing controller of the preferred embodiment. The focusing controller 420 includes an analog-to-digital converter (A/D converter) 520, a coupler 540, a focus compensator 550 and a digital-to-analog converter (D/A converter) 560. A/D converter 520 receives and digitizes the focus error signal Fe and outputs a digital focus error signal Fe'. Then, the coupler 540 receives the digital focus error signal Fe' and the offset signal OF for coupling the digital focus error signal Fe' with the offset signal OF to output a coupled signal Fe'_OF. Then the focus compensator 550 receives the coupled signal Fe'_OF and outputs a compensation signal Sc. The D/A converter 560 receives the compensation signal Sc from the focus compensator 550 and outputs the focus control signal Foo. The above-mentioned coupler 540 can be an adder for summing the digital focus error signal Fe' and the offset signal OF. The externally added offset signal OF is used to couple with the digital focus error signal Fe' so as to focus the laser beam at a position deviated from a preset focus point, such as slightly off the disk. Because the laser beam is out of focus with the disk, the intensity of the reflected light is not as strong as when the laser beam is in the normal focused position so that the coupling of track error signal Te to the focus error signal is reduced. In other words, the noise coupled to the focus error signal is reduced such that the vibration of the focus error signal is reduced and the stability of the servo system is enhanced. It is note-worthy that the offset signal OF can be a small value so as to offset the focus a little bit from the disk. In the preferred embodiment, a value of one-thirtieth of the DC component of peak-to-peak value of the focus error signal can be used for the offset signal OF. Of course, one skilled in the art can alter the value of the offset signal OF according to the actual practice, but the various modifications and similar arrangements and procedures according to the invention are still considered to be in the scope of the invention.

Figure 6:
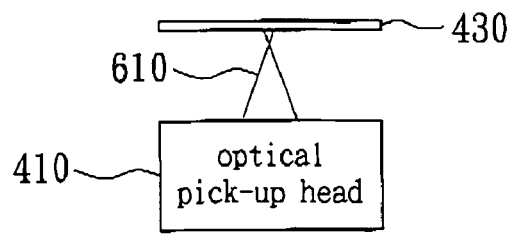
FIG. 6 is a diagram showing the relative position of the optical pick-up head 410 and the optical disk 430.

FIG. 6 is a diagram showing the relative position of the optical pick-up head 410 and the optical disk 430. While seeking, the offset signal OF is used to focus the laser beam slightly off the surface of the optical disk 430 so as to let the focus error signal couple less noises, such as the track error signal. In an embodiment, the offset signal OF is a DC signal. Besides, the apparatus and method disclosed according to the preferred embodiment of the invention, the invention can be applied to any other optical electronic device, such as CD-ROM drive, CD-RW drive, DVD-ROM drive, DVD+R drive, or DVD-RAM drive. People skilled in the art can apply the disclosed approach to the desired optical electronic devices.

The focusing controller and the method thereof according the embodiment of the invention can, while seeking, stabilize the focus of the optical pick-up head regardless of the noise. The disclosed method is only used while seeking, when no data is being read, so that the out of focus laser beam does not have any undesirable effect.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A control apparatus for stabilizing a servo system in an optical electronic device, the optical electronic device including a focusing controller for outputting a focus control signal and an optical pick-up head for accessing an optical disk, the control apparatus comprising:
    a coupler that is configured to (a) receive a focus error signal outputted by the optical pick-up head, (b) receive a digital offset signal that is a direct current (DC) signal having a digital value encoded thereon, and (c) couple the focus error signal with the digital offset signal to generate a coupled signal according to the focus error signal and the digital value encoded on the digital offset signal; and
    a focus compensator that is configured to receive the coupled signal and to output the focus control signal to control a focus point of the optical pick-up head;
wherein the optical electronic device reads data during a first operating state and seeks a track during a second operating state, wherein during the first operating state a first digital value is encoded on the digital offset signal such that the focusing of the optical pick-up head is regulated onto a first focus point, and wherein during the second operating state, the digital value encoded on the digital offset signal is different than the first digital value such that the focusing of the optical pick-up head is regulated away from the first focus point by a distance that is based on a value of the focus error signal.

2. The control apparatus according to claim 1, wherein a low-frequency error component is encoded on the focus error signal.

3. The control apparatus according to claim 1, wherein the coupler is an adder.

4. The control apparatus according to claim 1, wherein during the second operating state the digital offset signal is a non-zero DC signal having a non-zero digital value encoded thereon that is proportionate to the value of the focus error signal.

5. The control apparatus according to claim 1, wherein the focus compensator is further configured to regulate the focus of the optical pick-up head to a second focus point during the second operating state; and wherein the second focus point is away from the optical disk and the first focus point is nearer the optical disk than the second focus point.

6. The control apparatus according to claim 1, wherein the first value is zero.

7. A control method for stabilizing a servo system in an optical electronic device, the optical electronic device including an optical pick-up head and a focusing controller, the optical electronic device being used for outputting a focus control signal to control the optical pick-up head for accessing an optical disk, the method comprising:
    coupling a focus error signal with a digital offset signal that is a direct current (DC) signal having a digital value encoded thereon to generate a coupled signal;
    inputting the coupled signal to the focusing controller; and
    outputting the focus control signal to the optical pick-up head such that during a first operating state, the optical pick-up head is focused onto a first focus point; and during a second operating state, the optical pick-up head is focused away from the first focus point by a distance that is based on a value of the focus error signal.

8. The method according to claim 7, wherein a low-frequency error component is encoded on the focus error signal.

9. An optical disk drive for accessing an optical disk, comprising:
    means for accessing the optical disk and for providing a focus error signal and a digital offset signal that is a direct current (DC) signal having a digital value encoded thereon;
    means for coupling the focus error signal and the digital offset signal to generate a coupled signal; and
    means for compensating focus based on the coupled signal such that (a) during a first operating state the digital value encoded on the digital offset signal represents zero and a focus point of a laser beam of the optical pick-up head is regulated to a first preset focus point, and (b) during a second operating state the digital value encoded on the digital offset signal represents a value that corresponds to a value of the focus error signal and the focus point of the laser beam of the optical pick-up head is regulated to a second focus point, wherein a distance between the first preset focus point and the optical disk is different than a distance between the second focus point and the optical disk.

10. The optical disk drive according to claim 9, wherein a low-frequency error component is encoded on the focus error signal.

11. The optical disk drive according to claim 9, wherein the coupler is an adder.

12. A control apparatus for stabilizing a servo system comprising:
   a focus compensator that is configured to:
      regulate, during a first operating state, a focus of an optical pick-up head to a first location according to a focus error signal; and
      regulate, during a second operating state, the focus of the optical pick-up head away from the first location according to the focus error signal.

13. The control apparatus according to claim 12, further comprising:
   the optical pick-up head.

14. The control apparatus according to claim 12, wherein data is read during the first operating state, and wherein seeking occurs during the second operating state.

15. The control apparatus according to claim 12, wherein data is written during the first operating state, and wherein seeking occurs during the second operating state.

16. The control apparatus according to claim 12, wherein the focus compensator is further configured to regulate, during the second operating state, the focus of the optical pick-up head to a second location; and wherein the second location is spaced apart from the first location by a distance that is proportionate to a value of the focus error signal.

* * * * *

UNITED STATES PATENT AND TRADEMARK OFFICE
CERTIFICATE OF CORRECTION

PATENT NO. : 7,646,682 B2 Page 1 of 1
APPLICATION NO. : 10/990860
DATED : January 12, 2010
INVENTOR(S) : Lei et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 582 days.

Signed and Sealed this

Sixteenth Day of November, 2010

David J. Kappos
*Director of the United States Patent and Trademark Office*